(12) United States Patent
Jin

(10) Patent No.: US 7,347,568 B2
(45) Date of Patent: Mar. 25, 2008

(54) COLOR WHEEL APPARATUS AND OPTICAL ENGINE HAVING THE SAME

(75) Inventor: Yeon-sig Jin, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 328 days.

(21) Appl. No.: 11/258,039

(22) Filed: Oct. 26, 2005

(65) Prior Publication Data
US 2006/0126030 A1 Jun. 15, 2006

(30) Foreign Application Priority Data
Dec. 13, 2004 (KR) .................. 10-2004-0104893

(51) Int. Cl.
G03B 21/14 (2006.01)
(52) U.S. Cl. .................. 353/84; 359/892; 348/743
(58) Field of Classification Search .................. 353/31, 353/84; 349/5, 7; 359/892; 348/742, 743, 348/771
See application file for complete search history.

(56) References Cited

U.S. PATENT DOCUMENTS 5,868,482 A * 2/1999 Edlinger et al. .............. 353/84
7,199,952 B2 * 4/2007 Niwa et al. .................. 359/892
2005/0179824 A1 * 8/2005 Ahn .............................. 348/743
2006/0007408 A1 * 1/2006 Kim .............................. 353/84
2006/0132720 A1 * 6/2006 Goo .............................. 353/84

FOREIGN PATENT DOCUMENTS

| JP | 02-148509 | 6/1990 |
| JP | 08-214580 | 8/1996 |
| JP | 2001-337390 | 12/2001 |
| JP | 2003-57424 | 2/2003 |
| KR | 1996-33146 | 9/1996 |

* cited by examiner

*Primary Examiner*—William C. Dowling
(74) *Attorney, Agent, or Firm*—Roylance, Abrams, Berdo & Goodman, LLP

(57) ABSTRACT

Disclosed is a color wheel apparatus for a DLP type display device having a color wheel unit, which has a color filter and a rotation part for supporting the color filter and rotating integrally with the color filter; a color wheel supporter for rotatably supporting the color wheel unit; a sensor having a light emitter provided in the color wheel supporter and emitting light to the rotation part, and a light receiver to receive the light reflected from the rotation part; and an index part patterned on a predetermined region of a circumference of the rotation part to irregularly reflect the light emitted from the light emitter.

8 Claims, 5 Drawing Sheets

COLOR WHEEL APPARATUS AND OPTICAL ENGINE HAVING THE SAME

CROSS-REFERENCE TO RELATED APPLICATION

This application claims the benefit under 35 U.S.C. §119(a) of Korean Patent Application No. 2004-0104893, filed on Dec. 13, 2004, in the Korean Intellectual Property Office, the entire disclosure of which is hereby incorporated by reference.

BACKGROUND OF THE INVENTION

1. Field of the Invention

The present invention relates to a color wheel apparatus and an optical engine having the same. More particularly, the present invention relates to a color wheel apparatus with an improved index part and an optical engine having the same.

2. Description of the Related Art

Generally, an optical engine is provided in a display apparatus such as a projection television or a projector, and projects an image on a screen. Such an optical engine is classified into a cathode ray tube (CRT) type, a liquid crystal display (LCD) type, a digital light processing (DLP) type, and the like according to the type of display device for displaying the processed video data.

In particular, the DLP type optical engine comprises a color wheel unit. The color wheel unit typically comprises a plurality of color filters for selectively filtering red (R), green (G) or blue (B) out of white light emitted from a light source.

The color wheel unit is rotatable for allowing the light emitted from the light source to selectively pass through one of the color filters.

As an example of an optical engine with the color wheel unit, a DLP type system has been disclosed in Korean Patent Laid-Open Publication No. 2004-91830, wherein the DLP system comprises an index mark provided in the color wheel unit, and an optical sensor sensing the index mark so as to synchronize the rotation speed and a color phase of the color wheel unit with a video signal.

Such a conventional index mark is achieved by applying black tape or black paint on the color wheel unit, thereby absorbing the light emitted from the optical sensor. Thus, the optical sensor senses the index mark of the color wheel unit, so that the rotation speed and the color phase of the color wheel unit can be synchronized with the video signal.

However, the tape attached on the color wheel unit is susceptible to high-speed rotation and the paint applied on the color wheel unit is susceptible to the high temperatures produced during operation, so the conventional index mark is likely to deviate or deteriorate.

SUMMARY OF THE INVENTION

Accordingly, it is an aspect of the present invention to provide a color wheel apparatus and an optical engine having the same, in which an index part is prevented from deteriorating or being damaged.

Additional aspects and advantages of the present invention will be set forth in the following description of embodiments of the present invention.

The foregoing and other aspects of the present invention are also achieved by providing a color wheel apparatus for a DLP type display, comprising a color wheel unit comprising a color filter and a rotation part for supporting the color filter and rotating integrally with the color filter; a color wheel supporter for rotatably supporting the color wheel unit; a sensor comprising a light emitter provided in the color wheel supporter for emitting light to the rotation part, and a light receiver to receive the light reflected from the rotation part; and an index part patterned on a predetermined region of a circumference of the rotation part and irregularly reflecting the light emitted from the light emitter.

According to another aspect of the present invention, the index part is patterned to have a serrated shape that scatters the light emitted from the sensor.

According to a further aspect of the present invention, the index part is formed with an inclined on the rotation part for irregularly reflecting the light emitted from the sensor.

According to yet another aspect of the present invention, the rotation part comprises a filter supporter for supporting the color filter; a motor body coupled to the filter supporter and rotating integrally with the filter supporter; and a motor shaft coupled to the color wheel supporter to allow the motor body to rotate, and an index part formed on an outer circumference of at least one of the motor body and the filter supporter.

The foregoing and other aspects of the present invention are also achieved by providing an optical engine for a DLP type display device, comprising a light source to emit light; a color wheel apparatus for selectively filtering light emitted from the light source; a DLP panel for forming an image by adjusting a reflecting angle of the light passed through the color wheel apparatus; and a projecting lens for projecting the image formed on the DLP panel to a screen. The color wheel apparatus comprises a color wheel unit comprising a color filter and a rotation part supporting the color filter and rotating integrally with the color filter; a color wheel supporter for rotatably supporting the color wheel unit; a sensor comprising a light emitter is provided in the color wheel supporter for emitting light to the rotation part, and a light receiver to receive the light reflected from the rotation part; and an index part patterned on a predetermined region of a circumference of the rotation part for irregularly reflecting the light emitted from the light emitter.

According to an aspect of the present invention, the rotation part comprises a filter supporter for supporting the color filter; a motor body coupled to the filter supporter that rotates integrally with the filter supporter; and a motor shaft coupled to the color wheel supporter thereby allowing the motor body to rotate, and the index part is formed on an outer circumference of at least one of the motor body and the filter supporter.

BRIEF DESCRIPTION OF THE DRAWINGS

The above and other aspects and advantages of the present invention will become apparent and more readily appreciated from the following description of the embodiments when taken in conjunction with the accompanying drawings of which.

DETAILED DESCRIPTION OF EXEMPLARY EMBODIMENTS

Figure 1:
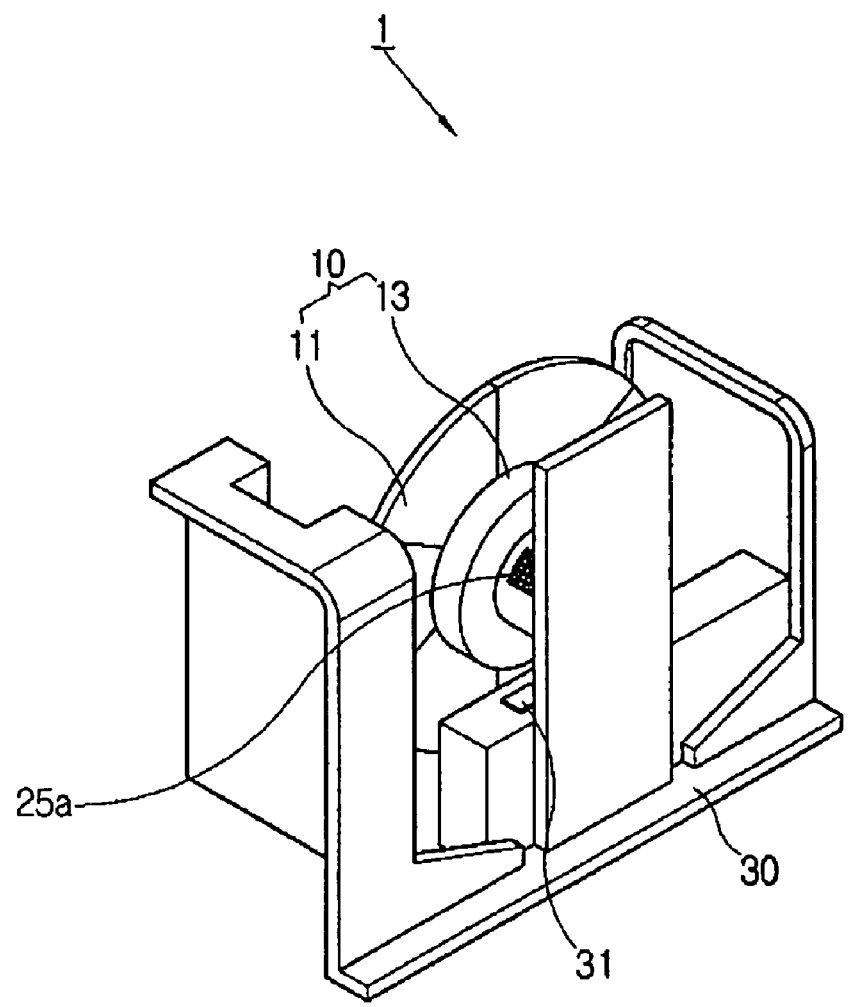
FIG. 1 is a perspective view of a color wheel apparatus according to an embodiment of the present invention.

Reference will now be made in detail to the embodiments of the present invention, examples of which are illustrated in the accompanying drawings, wherein like reference numerals refer to like elements throughout.

Figure 3:
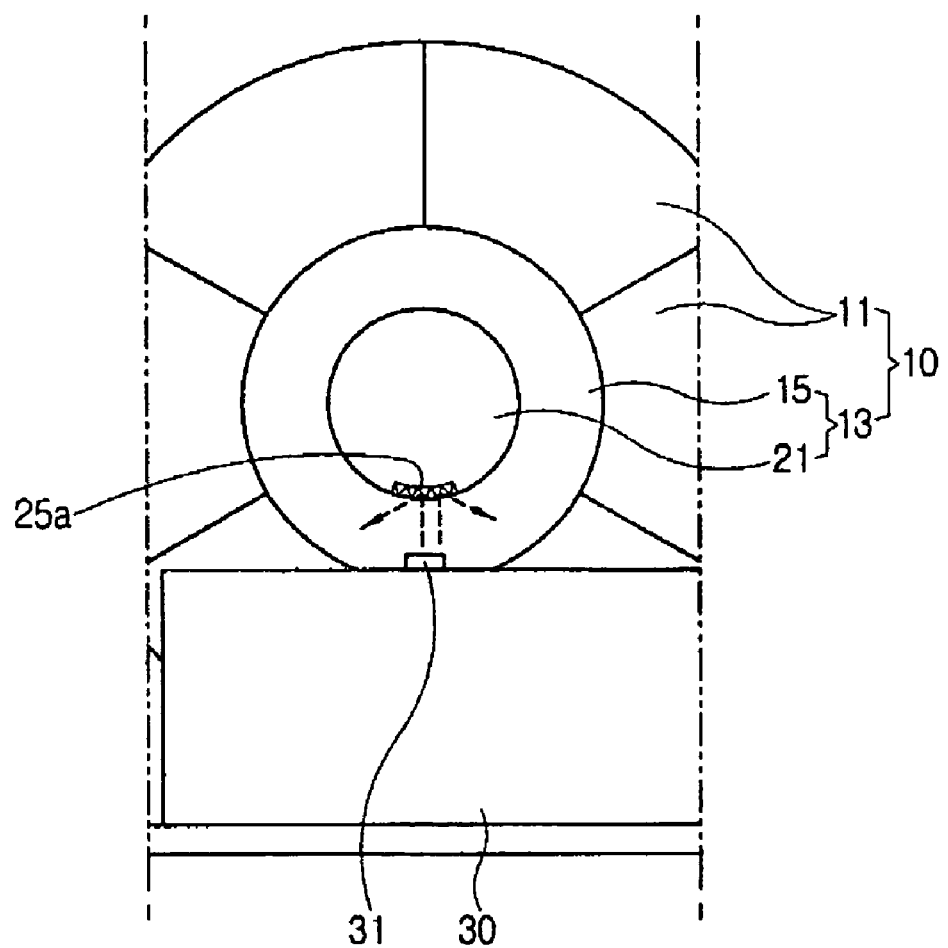
FIG. 3 is a sectional view of an index part provided in the color wheel apparatus according to an embodiment of the present invention.

As shown in FIGS. 1 and 3, a color wheel apparatus 1 according to an embodiment of the present invention comprises a color wheel unit 10, which comprises a plurality of color filters 11, and a rotation part 13 supporting the color filters 11. The rotation part 13 rotates with the color filters 11. A color wheel supporter 30 is rotatably supporting the color wheel unit 10. A sensor 31 is provided in the color wheel supporter 30. An index part 25a is provided in a predetermined region of the rotation part 13 to irregularly reflect light emitted from the sensor 31.

The color wheel unit 10 is shaped like a disc, and is generally provided in a DLP type optical engine. Here, the color wheel unit 10 is rotatably coupled to the color wheel supporter 30, and allows the light emitted from the light source to be selectively pass through one of the color filters 11.

The color filter 11 selectively filters red (R), green (G) or blue (B) out of the light emitted from a light source. The color filter 11 is one of a plurality of color filters 11 that are provided to pass the red (R), the green (G) and the blue (B) light, respectively. Each color filter 11 has a fan shape, and is coupled to a filter supporter 15 of the rotation part 13, which will now be described in more detail.

Figure 2:
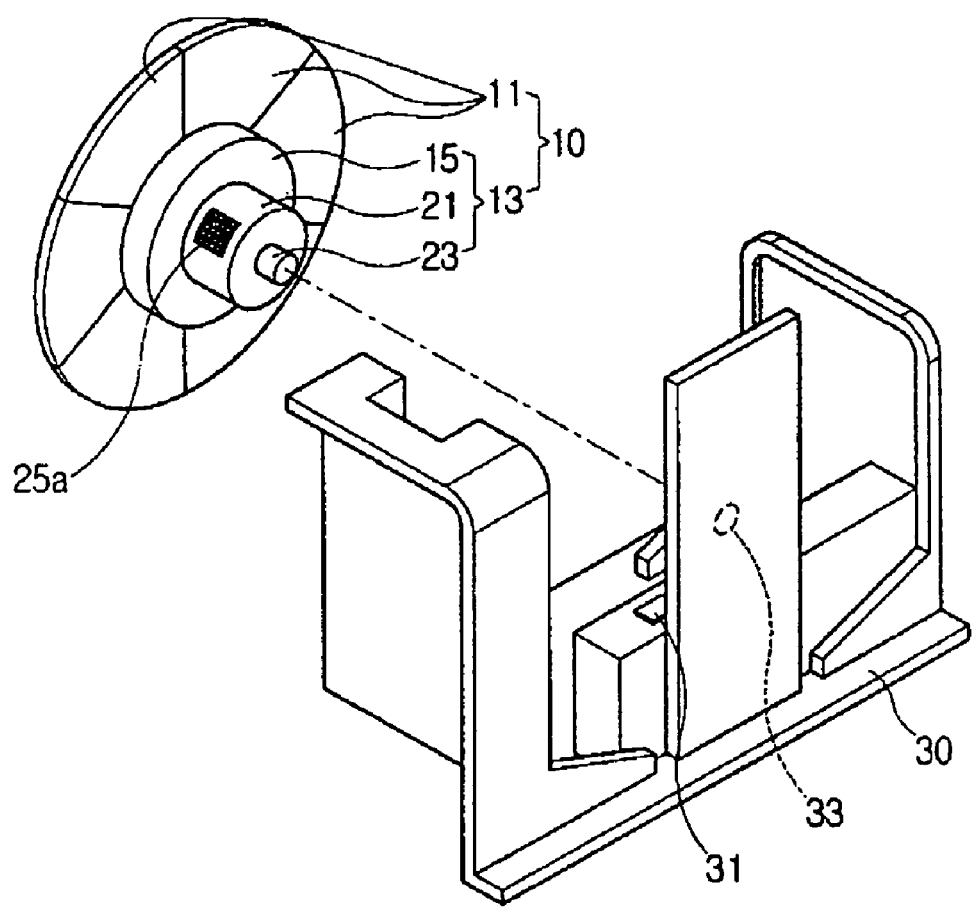
FIG. 2 is an exploded perspective view of the color wheel apparatus according to an embodiment of the present invention.

Referring to FIG. 2, the rotation part 13 comprises the filter supporter 15 to support the color filter 11, a motor body 21 coupled to the filter supporter 15, and a motor shaft 23 coupled to the color wheel supporter 30 that allows the motor body 21 to rotate with the filter supporter 15.

The filter supporter 15 is shaped like a circular plate and supports the plurality of color filters 11. Therefore, the plurality of color filters 11 are radially coupled on the outer circumference of the filter supporter 15. The filter supporter 15 is preferably made of aluminum. Alternatively, the filter supporter 15 may be made of other various suitable materials that are capable of supporting the plurality of color filters 11.

The motor body 21 has a first side coupled to the center of the filter supporter 15 and is rotatable together with the filter supporter 15. The motor body 21 also has a second side coupled to the motor shaft 23 and is supported by the color wheel supporter 30. Alternatively, the motor body 21 may be supported by the color wheel supporter 30, and the motor shaft 23 may be coupled to the filter supporter 15, thereby allowing the filter supporter 15 to rotate. The outer circumference of the motor body 21 has a cylindrical shape, and is made of a material capable of reflecting light from the sensor 31 to the sensor 31. For example, the outer circumference of the motor body 21 is preferably made of aluminum.

The color wheel supporter 30 is formed with a shaft coupling portion 33 to be coupled with the motor shaft 23 and rotatably supports the color wheel unit 10. Alternatively, when the motor shaft 23 is coupled with the filter supporter 15, the color wheel supporter 30 may be coupled with the motor body 21 and rotatably support the color wheel unit 10.

The sensor 31 is preferably provided in the color wheel supporter 30 and emits light to the index part 25a provided in the color wheel unit 10. Alternatively, the sensor 31 may be located at another region as long as it can emit light to the index part 25a provided in the color wheel unit 10. The sensor 31 comprises a light emitter (not shown) to emit light, and a light receiver (not shown) to receive the light reflected from the rotation part 13. The light emitted from the light emitter of the sensor 31 preferably includes infrared light, but is not limited to emitting only infrared light and may emit various types of light.

The index part 25a is patterned on a predetermined region of the rotation part 13 so as to irregularly reflect the light emitted from the sensor 31. According to an embodiment of the present invention, the index part 25a is formed on the outer circumference of the motor body 21. Alternatively, the index part 25a may be formed in the filter supporter 15, and may be in another region that is rotated integrally with the color filter 11. Further, the index part 25a may have a serrated shape to scatter the light emitted from the sensor 31. As shown in FIGS. 2 and 3, the index part 25a is cut away to have a serrated shape, thereby scattering the light emitted from the light emitter of the sensor 31 so that substantially no light is directed to the light receiver of the sensor 31. According to an embodiment of the present invention, the index part 25a is preferably cut away to have the serrated shape on a predetermined region of the outer circumference of the monitor body 21.

Figure 4:
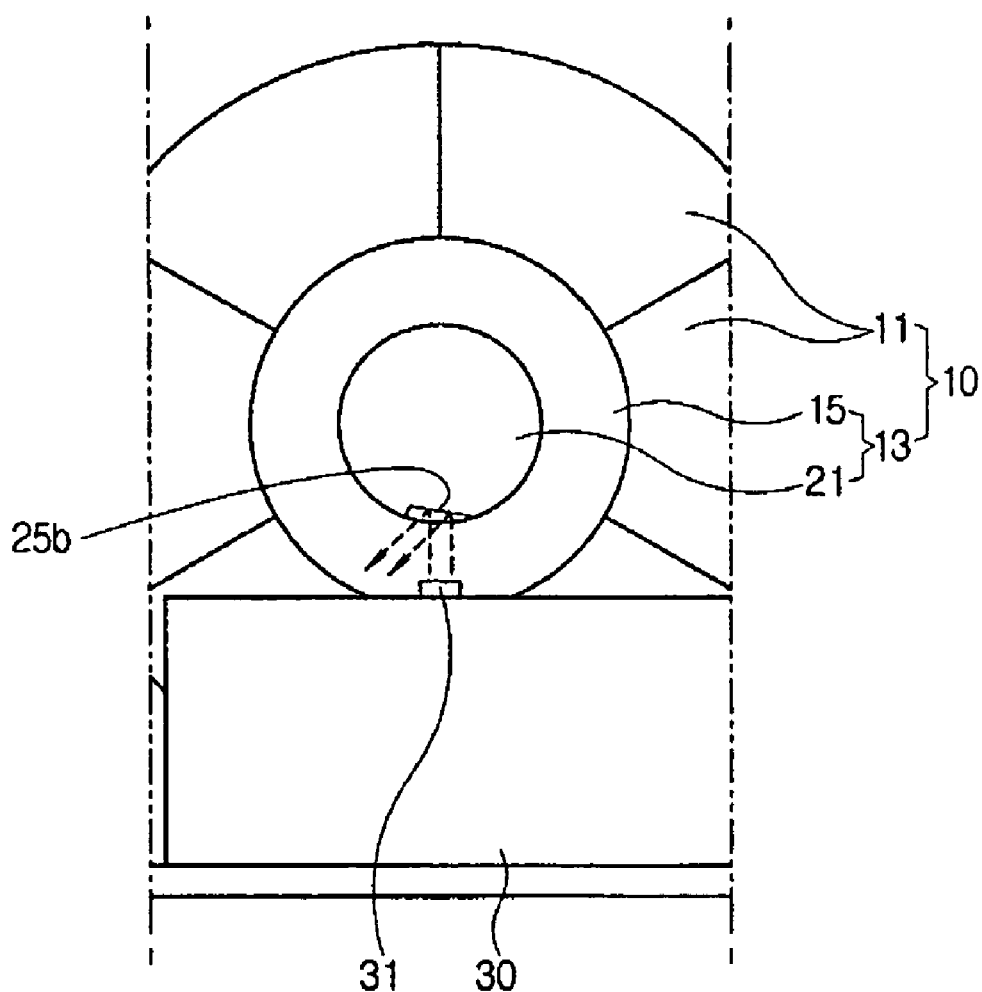
FIG. 4 is a sectional view of an index part provided in the color wheel apparatus according to an embodiment of the present invention.

FIG. 4 illustrates another index part provided in the color wheel apparatus according to an embodiment of the present invention. As shown therein, an index part 25b is formed at an incline on the rotation part 13 in order to irregularly reflect the light emitted from the sensor 31. Further, the index part 25b is cut away to have the inclined shape, thereby preventing the light emitted from the light emitter of the sensor 31 from returning to the light receiver of the sensor 31. That is, according to an embodiment of the present invention, the index part 25b may be cut away to be formed at an incline on a predetermined region of the outer circumference of the motor body 21. However, the index part 25a or 25b are not limited to having a serrated shape and the inclined shape, and may have various other shapes such as a plurality of cones, a plurality of quadrangular pyramids as long as it can substantially scatter the light emitted from the sensor 31 away from the light receiver (not shown).

With this configuration, the color wheel apparatus 1 according to an embodiment of the present invention operates as follows.

When electric power is supplied to the motor body 21, the filter supporter 15 and the motor body 21 are rotated integrally with each other. Further, the light emitter of the sensor 31 emits light, and the light is reflected from the outer circumference of the motor body 21 to the light receiver of the sensor 31. When the light emitted from the light emitter of the sensor 31 is projected on the index parts 25a or 25b formed on the outer circumference of the rotating motor body 21, the projected light is irregularly reflected from the index part 25a or 25b, so that the light receiver of the sensor 31 cannot receive the reflected light. Thus, the sensor 31 senses the rotation speed, the color phase, or the like of the color wheel unit 10 based on the light receiver of the sensor 31 not receiving the light scattered by the index parts 25a or 25b.

As described above, in the color wheel apparatus according to an embodiment of the present invention, the index part 25a or 25b is provided in the rotation part of the color wheel unit so as to irregularly reflect the light emitted from the sensor, thereby preventing the index part 25a or 25b from being damaged due to the high-speed rotation of the color wheel unit 10 or the high temperature of the light source.

Figure 5:
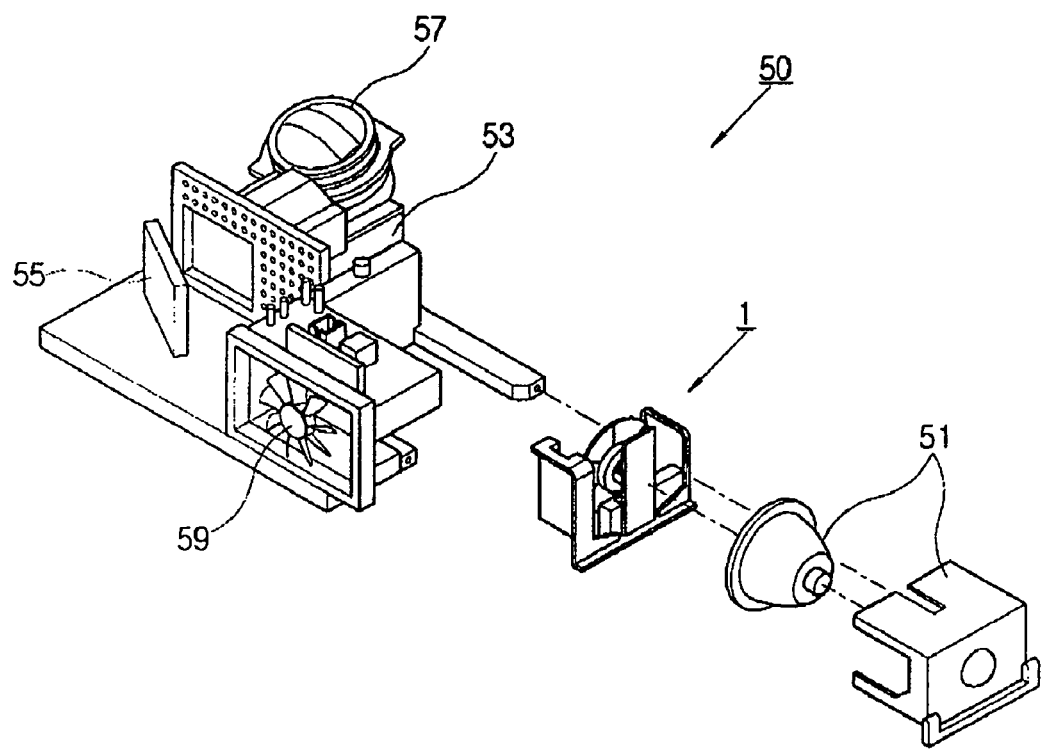
FIG. 5 is an exploded perspective view of an optical engine according to an embodiment of the present invention.

FIG. 5 is an exploded perspective view of an optical engine according to an embodiment of the present invention. As shown therein, an optical engine 50 according to an embodiment of the present invention comprises a light source 51 for emitting light in a DLP type display device; a color wheel apparatus 1 to selectively filter the light emitted from the light source 51; a DLP panel 55 forming an image by adjusting a reflection angle of the light passed through the color wheel apparatus 1; and a projecting lens 57 to project the image formed on the DLP panel 55 to a screen (not shown). According to an embodiment of the present invention, the optical engine 50 further comprises an optical unit 53 interposed between the light source 51 and the color wheel apparatus 1 or between the color wheel apparatus 1 and the DLP panel 55, and a cooling fan 59 to cool the light source 51 and the color wheel apparatus 1, which radiate heat that reaches a high temperature.

The light source 51 includes an arc-discharging lamp such as a mercury lamp, a metal halide lamp, or a xenon lamp. When the light source 51 emits light, high temperature heat is radiated.

With this configuration, the optical engine 50 according to an embodiment of the present invention is mounted to a projection television or a projector, and projects an image to a screen. Further, the optical engine according to an embodiment of the present invention is provided with the color wheel apparatus 1 comprising an index part 25a or 25b provided in the rotation part 13 of the color wheel unit 10 so as to irregularly reflect the light emitted from the sensor 31, thereby preventing the index part 25a or 25b from being damaged due to the high-speed rotation of the color wheel unit 10 or the high temperature of the light source 51.

As described above, the present invention provides a color wheel apparatus and an optical engine 50 with the same, in which an index part 25a or 25b is prevented from being damaged due to high-speed rotation of a color wheel unit 10 or high temperature of a light source 51.

Although embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A color wheel apparatus for a digital light processing (DLP) type display apparatus, comprising:
   a color wheel unit comprising a color filter and a rotation part for supporting the color filter and rotating integrally with the color filter;
   a color wheel supporter for rotatably supporting the color wheel unit;
   a sensor comprising a light emitter provided in the color wheel supporter for emitting light to the rotation part, and a light receiver for receiving the light reflected from the rotation part; and
   an index part patterned on a predetermined region of a circumference of the rotation part for irregularly reflecting the light emitted from the light emitter.

2. The color wheel apparatus according to claim 1, wherein the index part is patterned to have a serrated shape that scatters the light emitted from the light emitter.

3. The color wheel apparatus according to claim 1, wherein the index part is formed at an incline on the rotation part and irregularly reflects the light emitted from the sensor.

4. The color wheel apparatus according to claim 1, wherein the rotation part comprises:
   a filter supporter for supporting the color filter;
   a motor body coupled to the filter supporter and rotates integrally with the filter supporter; and
   a motor shaft coupled to the color wheel supporter for allowing the motor body to rotate, wherein the index part is formed on an outer circumference of at least one of the motor body and the filter supporter.

5. An optical engine for a digital light processing (DLP) type display device, comprising:
   a light source to emit light;
   a color wheel apparatus for selectively filtering light emitted from the light source;
   a DLP panel for forming an image by adjusting a reflecting angle of the light passed through the color wheel apparatus; and
   a projecting lens for projecting the image formed on the DLP panel to a screen, wherein the color wheel apparatus comprises:
   a color wheel unit comprising a color filter and a rotation part for supporting the color filter and rotating integrally with the color filter;
   a color wheel supporter for rotatably supporting the color wheel unit;
   a sensor comprising a light emitter provided in the color wheel supporter for emitting light to the rotation part, and a light receiver to receive the light reflected from the rotation part; and an index part patterned on a predetermined region of a circumference of the rotation part to irregularly reflect the light emitted from the light emitter.

6. The optical engine according to claim 5, wherein the index part is patterned to have a serrated shape that scatters the light emitted from the sensor.

7. The optical engine according to claim 5, wherein the index part is formed at an incline on the rotation part to irregularly reflect the light emitted from the sensor.

8. The optical engine according to claim 5, wherein the rotation part comprises a filter supporter for supporting the color filter; a motor body coupled to the filter supporter for rotating integrally with the filter supporter; and a motor shaft coupled to the color wheel supporter thereby allowing the motor body to rotate, and
   wherein the index part is formed on an outer circumference of at least one of the motor body and the filter supporter.

* * * * *